United States Patent [19]
Petroff

[11] Patent Number: 5,810,247
[45] Date of Patent: Sep. 22, 1998

[54] VEHICLE WINDSHIELD WASHING SYSTEM

[76] Inventor: Anthony N. Petroff, R.R. #1, Millbrook, ON, Canada, L0A1G0

[21] Appl. No.: 786,991

[22] Filed: Jan. 23, 1997

[51] Int. Cl.⁶ ....................................................... B60S 1/50
[52] U.S. Cl. ............................. 239/1; 239/74; 239/284.1; 239/333
[58] Field of Search ................... 239/284.1, 65, 239/71, 74, 333, 329, 375; 222/23; 248/127, 146

[56] References Cited

U.S. PATENT DOCUMENTS

| | | | |
|---|---|---|---|
| 2,105,676 | 1/1938 | Stow | 239/284.1 |
| 2,540,290 | 2/1951 | Rappl et al. | 239/284.1 X |
| 2,688,514 | 9/1954 | Oishei et al. | 239/284 X |
| 3,033,403 | 5/1962 | Adell | 239/284.1 X |
| 3,087,681 | 4/1963 | Riester | 239/284.1 |
| 4,331,295 | 5/1982 | Warmashi . | |
| 4,444,358 | 4/1984 | Spohn et al. | 239/284.1 |
| 4,700,424 | 10/1987 | Hagen . | |
| 4,824,021 | 4/1989 | Binder . | |
| 4,877,186 | 10/1989 | Scholl . | |
| 5,183,099 | 2/1993 | Belmu . | |
| 5,303,845 | 4/1994 | Osawa | 222/23 X |
| 5,327,614 | 7/1994 | Egner-Walter . | |

FOREIGN PATENT DOCUMENTS

| | | | |
|---|---|---|---|
| 1276305 | 11/1986 | U.S.S.R. | 239/65 |
| 718336 | 11/1954 | United Kingdom | 239/284.1 |

*Primary Examiner*—Kevin Weldon
*Attorney, Agent, or Firm*—James E. Castle

[57] ABSTRACT

Disclosed herein is a vehicle windshield washing installation comprising a vehicle having a storage location. A retail jug has an opening, carries windshield washing fluid and is positioned in the storage location. A pump unit pumps the fluid from the jug and includes an inlet channel which is dimensioned to extend into the opening to be in fluid communication with the fluid. A cover is removably attached to the opening. The pump unit further includes an outlet fluid channel for delivering the fluid to at least one predetermined windshield location on the vehicle.

21 Claims, 9 Drawing Sheets

VEHICLE WINDSHIELD WASHING SYSTEM

BACKGROUND OF THE INVENTION

1. Field of the Invention

The present invention relates to vehicle windshield washing systems.

2. Description of the Related Art

While those who live in northern climates tend to enjoy the changing of the seasons, one of the more mundane chores is to deal with winter conditions on highways, particularly visibility when driving. Many automobiles are equipped with state of the art windshield wipers that are intended to remove unwanted snow and debris from the windshield to maintain visibility.

Special windshield washing fluids are being sold that are advertised to help remove bugs and insects in summer and salt and ice in winter. Some automobiles are equipped with dashboard-mounted windshield washing fluid level indicators to alert the driver when more fluid needs to be added, that is to the receptacle in the engine compartment of the vehicle.

Usually, these receptacles are not easily accessible without reaching into the engine compartment, sometimes with an idling engine, posing serious risk of injury to an inattentive vehicle operator. Reaching into the engine compartment can result in muscle strain, not to mention soiled clothes and hands. Once the receptacle has been located, the retail fluid jug must be carefully oriented with its relatively small mouth directly above a correspondingly small opening on the receptacle, inevitably resulting in unwanted spillage.

Thus, despite the advances in wipers and washer fluid, the job of maintaining proper visibility for driving a vehicle remains an undesirable chore.

It is an object of the present invention to obviate or mitigate these disadvantages.

SUMMARY OF THE INVENTION

Briefly stated, the invention involves a vehicle windshield washing installation comprising:
  a vehicle having a storage location;
  a retail jug carrying windshield washing fluid positioned in the storage location; the jug having an opening;
  a pump unit for pumping the fluid from the jug; the pump unit including an inlet channel which is dimensioned to extend into the opening to be in fluid communication with the fluid;, a cover removably attached to the opening and arranged to seal the opening with the inlet channel therein, the pump unit further including an outlet fluid channel for delivering the fluid to at least one predetermined location on the vehicle.

In another aspect of the present invention, there is provided a method of dispensing windshield washing fluid in a vehicle, comprising the steps of;
  positioning a retail jug carrying windshield washing fluid positioned in a storage location in a vehicle; the jug having an opening;
  providing a pump unit for pumping the fluid from the jug; the pump unit including an inlet channel and an outlet channel;
  extending the inlet channel into the opening to be in fluid communication with the fluid;
  providing a cover for sealing the opening with the inlet channel therein.

orienting the outlet fluid channel so that the fluid is delivered to at least one predetermined location on the vehicle.

In still another aspect of the present invention, there is provided a vehicle windshield washing kit, comprising:
  a pump unit for pumping the fluid from a retail jug carrying windshield washing fluid to be positioned in a storage location of a vehicle; the pump unit including an inlet channel which is dimensioned to extend into an opening in the jug so to be in fluid communication with the fluid, a cover for removable attachment to the opening to seal the opening with the inlet channel therein, the pump unit further including an outlet fluid channel for delivering the fluid to at least one predetermined location on the vehicle; and
  a sheet of instructions to install the kit into the vehicle.

In yet another of its aspects, the present invention involves the use of a retail jug carrying windshield washing fluid as an on-board receptacle on a vehicle, and from which to pump such fluids for cleaning windshields while operating the vehicle.

In still another aspect of the present invention, there is provided a windshield washing system for a vehicle having a storage location, the system comprising:
  a pump unit for pumping the fluid from a retail jug carrying windshield washing fluid and having an opening, the jug to be positioned in the storage location; the pump unit including an inlet channel which is dimensioned to extend into the opening to be in fluid communication with the fluid; a cover removably attached to the opening and arranged to seal the opening with the inlet channel therein, the pump unit further including an outlet fluid channel for delivering the fluid to at least one predetermined location on the vehicle.

BRIEF DESCRIPTION OF THE DRAWINGS

Several preferred embodiments of the present invention will now be described, by way of example only, with reference to the appended drawings in which:

FIG. 3a is a fragmentary perspective view of one portion of the windshield washing system;

FIG. 3b is a fragmentary perspective view of an alternative to the portion illustrated in FIG. 3a;

DESCRIPTION OF THE PREFERRED EMBODIMENTS

Figure 1:
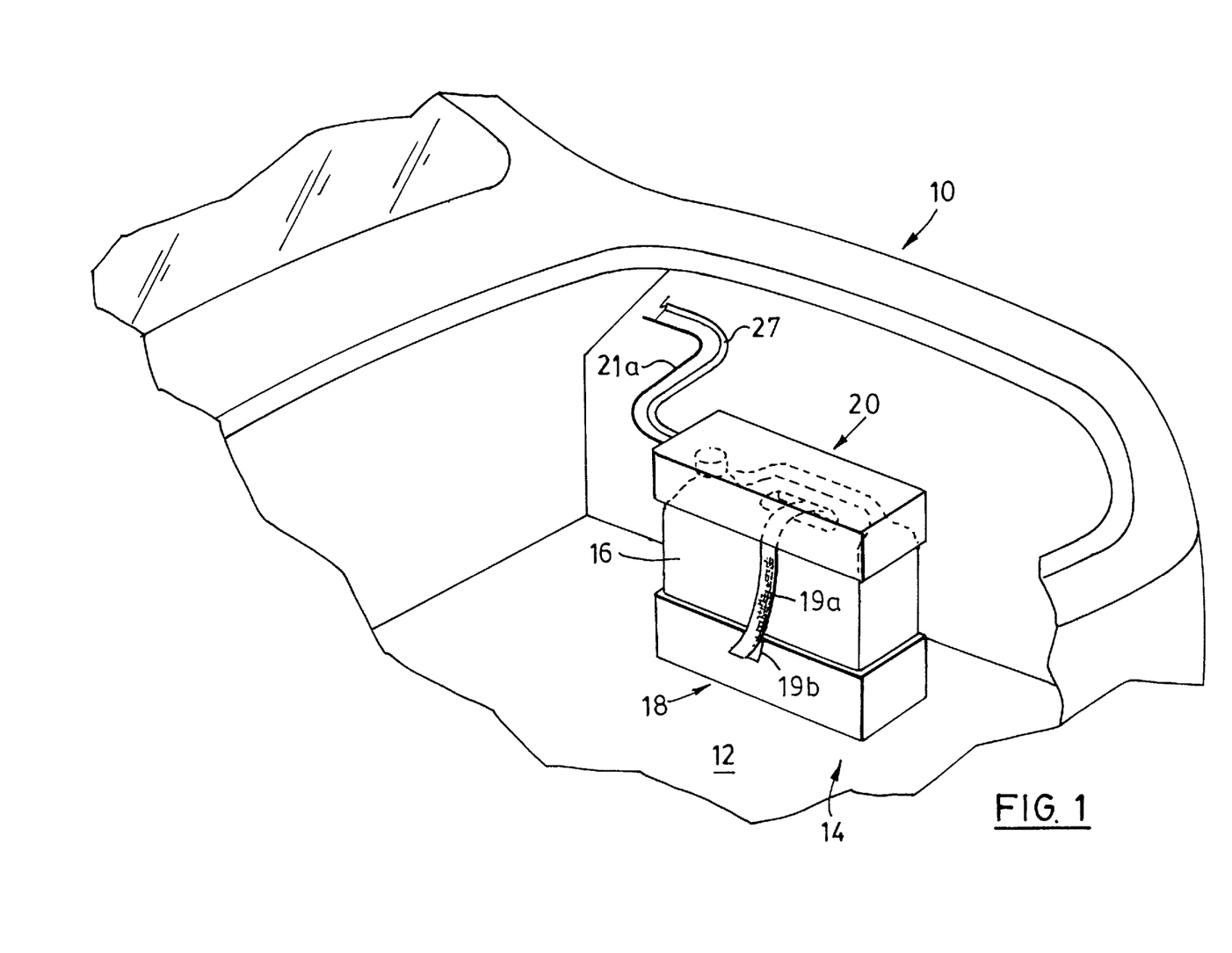
FIG. 1 is a fragmentary perspective view of a vehicle with a windshield washing system according to one embodiment of the present invention.
Figure 2:
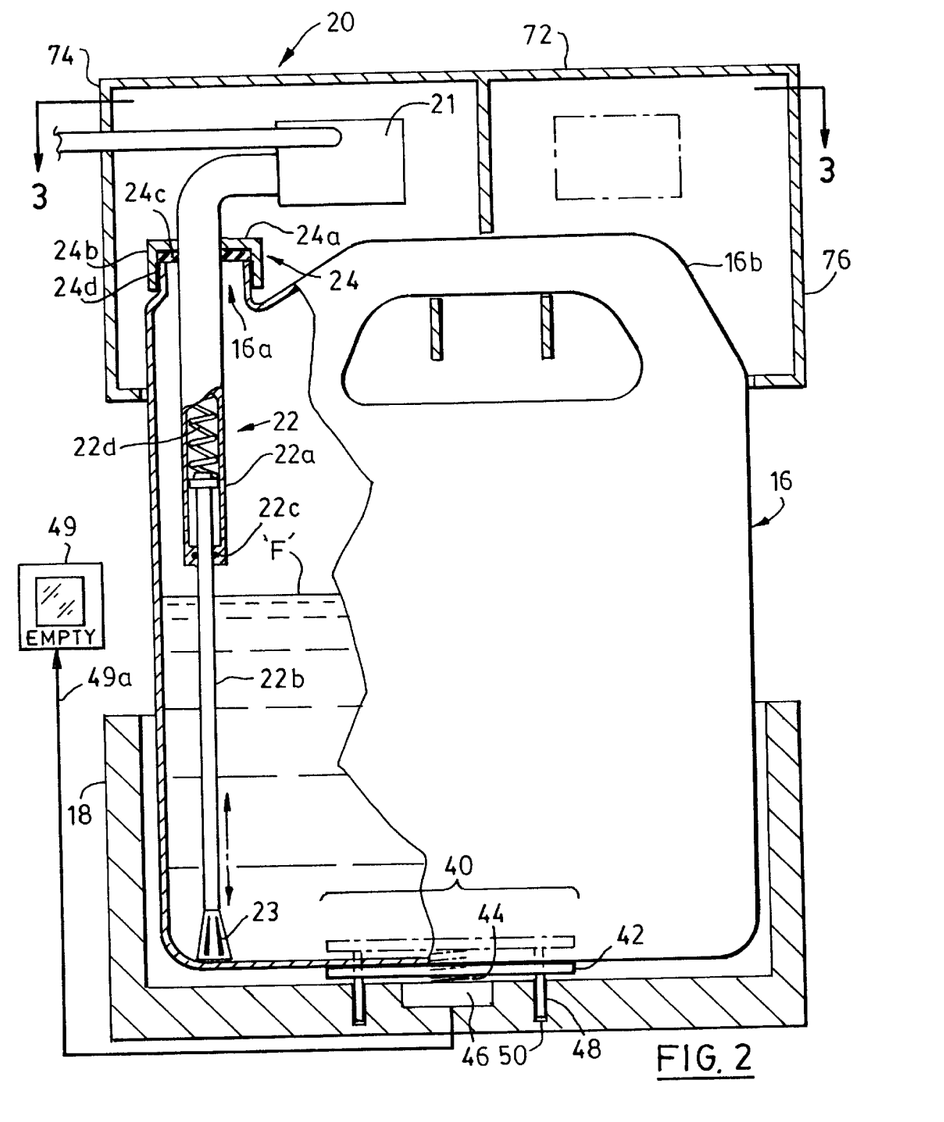
FIG. 2 is a sectional view of a portion of the windshield washing system illustrated in FIG. 1.

Referring to the figures, and more particularly to FIG. 1, there is provided a vehicle 10 having a rear end including a rear storage cavity 12 also known as a trunk. Located in the trunk is a windshield washing system 14 which makes use of a retail windshield washing fluid jug 16 carrying windshield washing fluid, (and of the type which are commonly used to merchandise windshield washing fluids at auto shops, gasoline stations and the like and hereinafter referred to simply as 'jug'). The system includes a means for receiving the jug, in the form of a jug holder 18 which holds the jug in a proper upright position. In this case, as shown in FIG. 2, the jug 16 is of a conventional variety and has an opening 16a, normally closed by covering lid not shown, and a hand grip formation 16b for carrying the jug. The jug holder should have dimensions that, while allowing the jug to be inserted easily therein, nonetheless maintain the position of the jug. For example, the approximate dimensions of a conventional jug may be about 5 inches thick, 7 inches long, 11.5 inches high in which case the approximate dimensions of the jug holder may be about 5.75 inches wide, 9.5 inches long and 5 inches deep.

The jug holder is attachable to an adjacent structure of the vehicle in a storage cavity thereof, which may be a trunk as shown above or instead be somewhere in the vehicle. For example, a region beneath the dashboard and immediately behind the fire wall may provide a convenient mounting location for trucks and busses. The jug holder itself may be secured in any appropriate manner while the jug itself may be held in position in the jug holder by way of a number of possible securing means such as a tape fastener shown at 19a which is mounted on one side of the jug holder, not shown, and whose free end is attachable to a complementary tape fastener 19b which is anchored to the facing side of the jug holder as shown in FIG. 1. The tape fasteners 19a, 19b may be hook and loop tape fasteners such as those sold under the trademark VELCRO.

A pump unit 20 is provided for pumping the fluid from the jug. Referring to FIG. 2, the pump unit includes an electric pump 21 which operates with the vehicles on-board power supply, which is usually 12 volts. The electric pump may be connected with the power supply in a number of arrangements, for example at the vehicle's fuse panel or some other location, via wire 21a. Referring to FIG. 2, The pump unit 20 has inlet channel means in the form of an inlet nozzle assembly 22 which is dimensioned to extend into the opening of the jug, and cover 24 is removably attachable to the opening with the covering lid removed, for positioning the inlet nozzle means in fluid communication with the windshield washing fluids therein. In this case, the cover 24 has a flange member 24a and a collar member 24b, having a diameter just larger than that of the jug opening, so that the collar member firmly engages the opening in a relatively water-tight fashion. Extra sealing discs and rings 24c, 24d and the like may be located in the collar member if desired to enhance this sealing, so that the collar member can fit the range of conventional jugs on the market.

Figure 3:
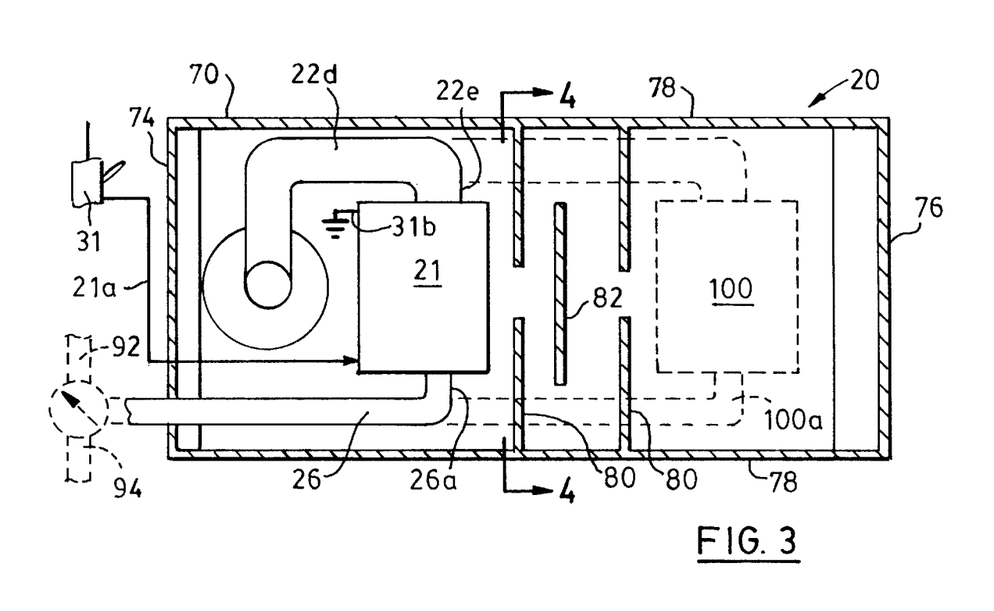
FIG. 3 is a sectional view taken on line 3—3 of FIG. 2.

The nozzle assembly has a first portion 22a which is anchored to the flange member 24a and a second portion 22b which is movable relative to the first portion to accommodate different height jugs. The second portion has a remote end with an inlet portion thereon as shown at 23. The second portion is also sealed with the first portion by way of an o-ring 22c. The second portion 22b is outwardly biased from the first portion by way of a spring 22d. With this arrangement, the second portion is arranged to be displaced toward its outward-most position relative to the first portion so that the inlet portion 23 abuts the bottom surface of the jug. Referring to FIG. 3, the first portion extends through the flange member 24a and is joined to an inlet channel 22d which in turn is coupled with the inlet of the pump as shown at 22e in FIG. 3.

Outlet fluid channel means, in the form of an outlet fluid channel 26 is also provided in fluid communication with the outlet of the pump as shown at 26a for delivering the fluid to predetermined locations adjacent at least one windshield on a vehicle, or another location such as the headlights. In this case, the fluid channel includes an outlet hose assembly 27 which is routed through the car chassis to the nozzle area of the front windshield, or the like.

Figures 3A, 3B:
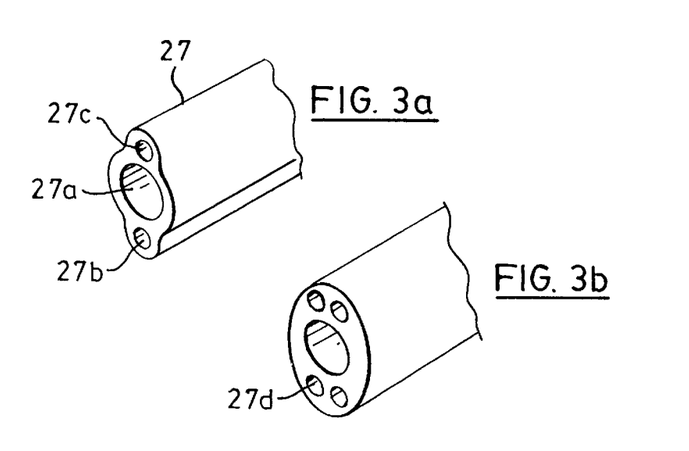

Referring to FIGS. 3a, 3b, the outlet hose assembly may, if desired, include a number of passages, a fluid passage 27a for the transfer of fluids, as well as a number of passages 27b, 27c for locating the wiring therein, for example, the lead lines for the motor. In this case, the passages are formed as an integral fashion from a resilient material such as synthetic rubber or the like. Alternatively, the outlet hose assembly may include more passages for wiring, for example for the switching of the motor and other electrical functions, as shown by 26d in FIG. 3b.

The pump unit is also provided with a switching arrangement to permit the driver of the vehicle to actuate the electric pump. The switching arrangement may simply make use of the switching arrangement for the vehicles on-board windshield washing system or may involve a separate switch 31 to be mounted in the dashboard region and within reach of the driver, as shown schematically coupled to the motor by wire 31a. The motor is grounded by connection 31b.

Referring to FIG. 2, a level indication means generally shown at 40 is provided for indicating the level of windshield washing fluids, as shown by 'F' in the jug and a register means, as shown by the register light at 49 is located in the vehicle in a location adjacent the driver of the vehicle to receive a signal from the level indication means and via wire 49a operable to indicate when the level of the fluid drops below a predetermined level in the jug. The level indication means includes a plate member 42 biased by a spring member 44 located in the jug holder to engage with the jug, and a contact means, in the form of a contact assembly, shown schematically by the block 46, is operable between a contacted state and a uncontacted state to register when the plate member exceeds a predetermined height. In this case, the base member may be stabilized in an appropriate fashion such as by the use of lateral support pins 48, each of which is positioned in a corresponding bore 50.

Figure 5:
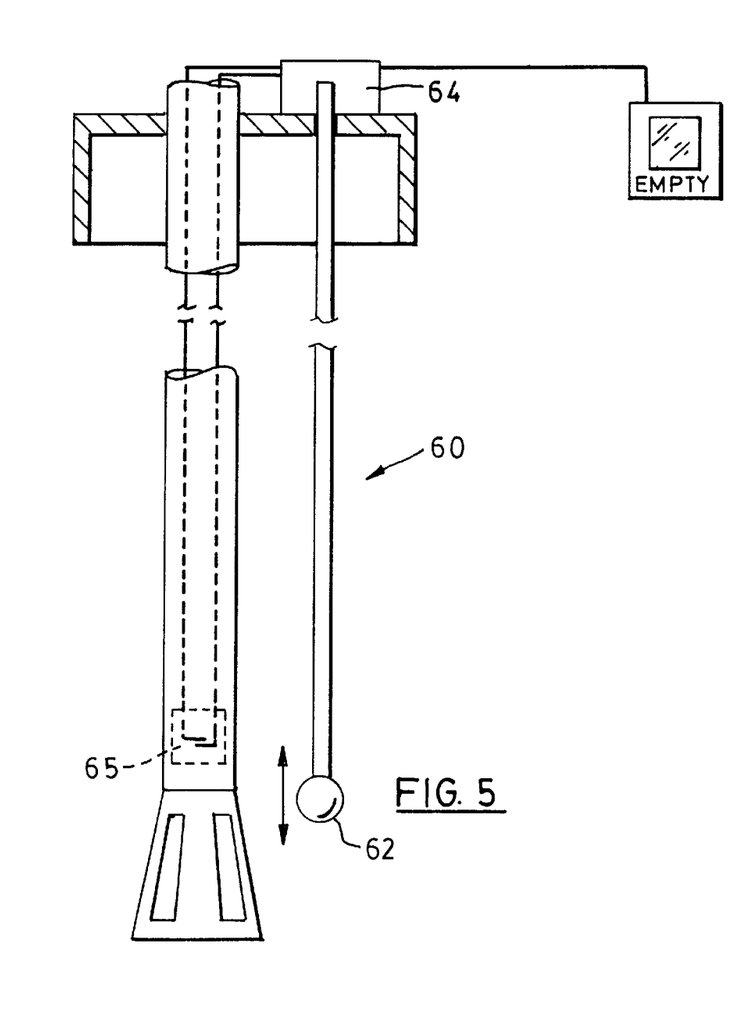
FIG. 5 is a magnified fragmentary perspective view of a portion of another windshield washing system.

Alternatively, as shown in FIG. 5, the level indication means may be located adjacent the nozzle by way of a level assembly 60 including a float 62. In this case, the buoyancy of the float causes an upward force on a contact assembly to maintain the contact assembly, shown schematically at 64, in one state so long as the buoyant force exerted on the float is not reduced by a lowering of fluid level. At this point, the state of the contact assembly changes to indicate a substantially empty jug. Alternatively, the level assembly may include a short circuit device, shown schematically at 65 to establish a short circuit with the fluid in the jug. In either case, the float or the short circuit device should be located at an appropriate location relative to the input portion so that the unit will indicate an empty tank before the fluid passes below the input portion.

Figure 5A:
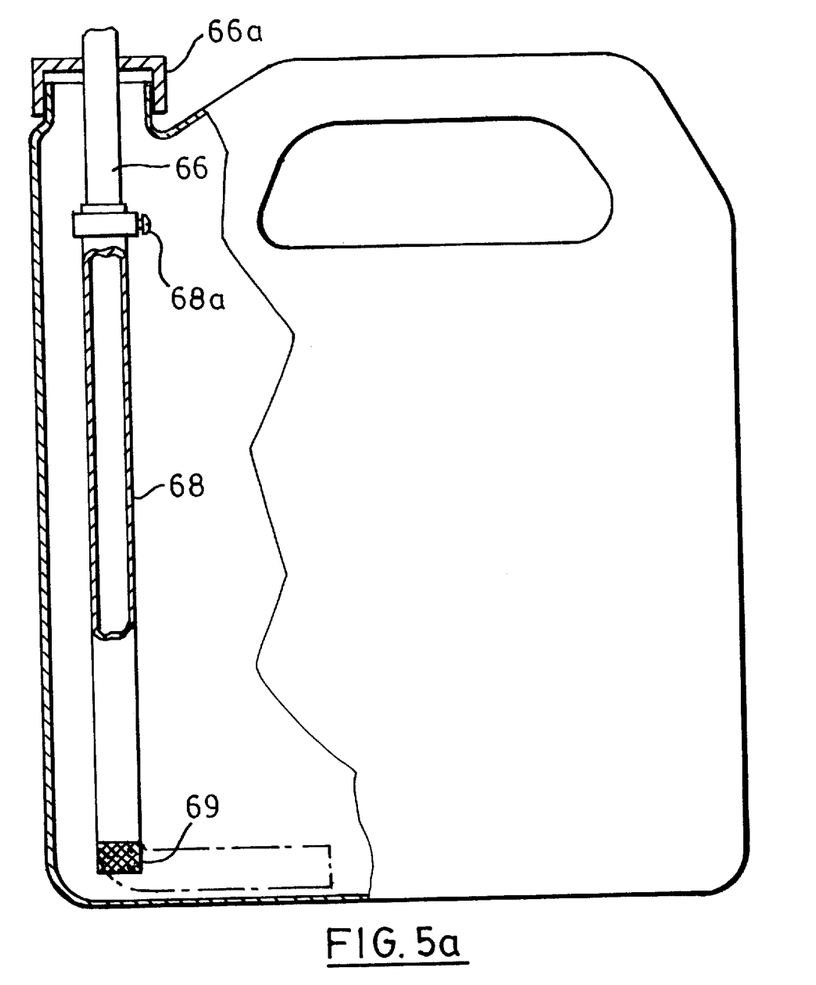
FIG. 5a is a fragmentary side view of a portion of still another windshield washing system.

Still another nozzle assembly is shown in FIG. 5a, in this case having a first portion 66 which is anchored to a flange member 66a and a second portion 68 which is slidably mounted on the first portion and held thereon, if desired, by way of a clamp member 68a. In this case, the second portion is a section of rubber tube whose length is selected according to the range of conventional retail jugs so that it will have sufficient length to reach the bottom of such jugs with a screen 69, or alternatively, and be sufficiently flexible to bend along the bottom of the jug if necessary. The nozzle assembly may also be formed with a single portion which is of a sufficient length to draw substantially all the contents from the jug without the need for two separate portions as above described.

Figure 4:
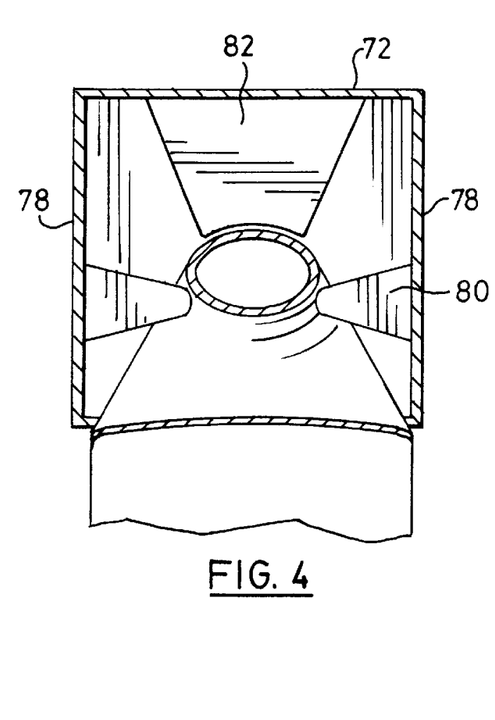
FIG. 4 is a fragmentary sectional taken on line 4—4 of FIG. 3.

Referring to FIGS. 2, 3 and 4, the pump unit 20 includes a housing 70 which is removably engageable with the jug. In this case, the housing has outer dimensions generally corresponding to those of the jug, with a top wall 72, front and rear end walls 74, 76 and two side walls 78 forming a generally rectangular bottom opened housing. The housing also provides means for engaging the hand grip formation in order to position the pump unit firmly on the jug. The engaging means includes two pairs of lateral flanges 80 extending from a corresponding side wall to engage a lower region of the handle grip portion and a vertical flange 82 extending from the top wall to engage an upper region of the hand grip portion.

If desired, the pump unit may be equipped to deliver fluids to two or more areas in the vehicle, such as thwindshields rear windshields as may be particularly useful for such vehicles as minivans and the like. In this case, the outlet fluid channel 26 may be arranged to provide fluid simultaneously to these two locations, by having a 'T' connection 90 with outlets 92 and 94 as well as a valve unit 96 to direct fluid either to one outlet or the other. Alternatively, a second electric pump 100 may be located in the housing with the inlet channel 22d extending also a second electric pump 100. In this case, the second electric pump has a separate outlet fluid channel 100a to deliver the fluids to a second location.

Figure 6:
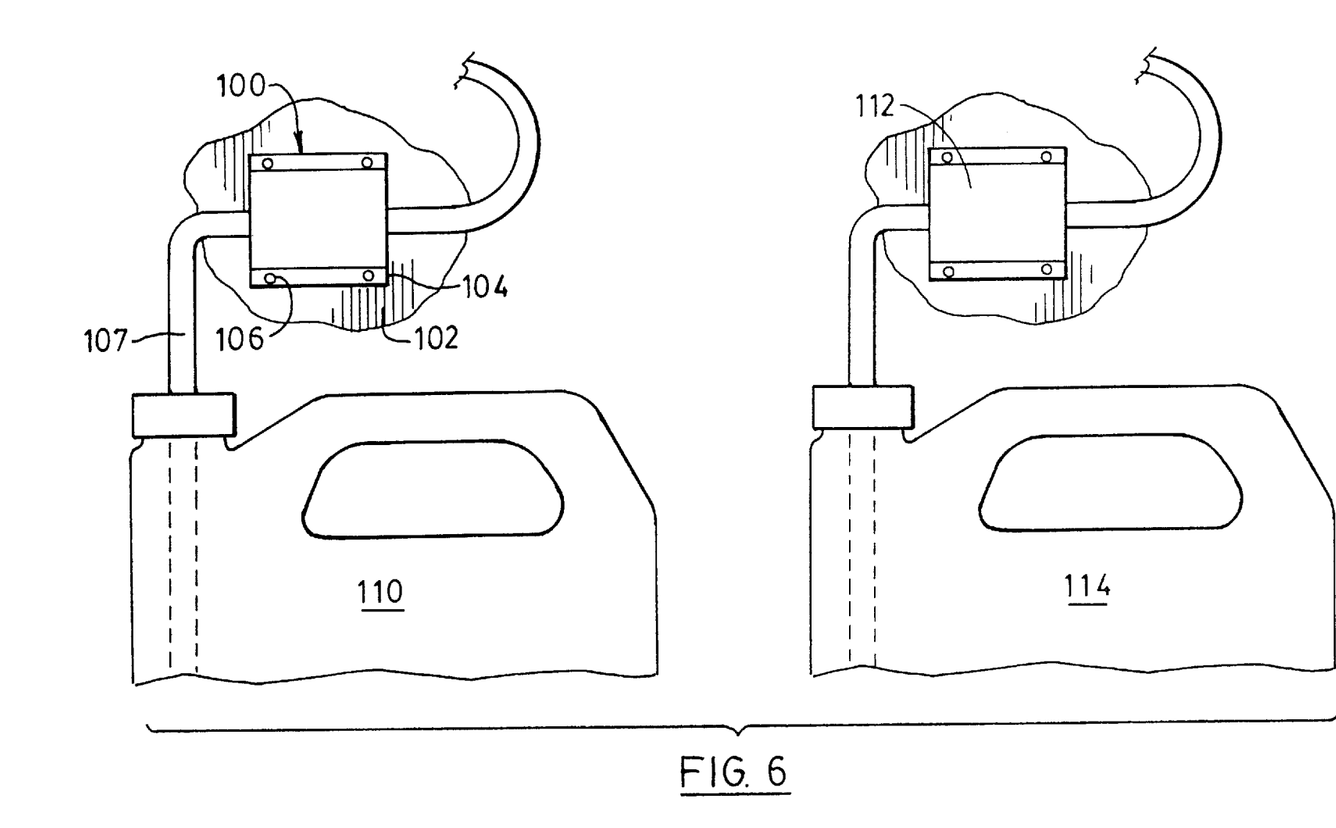
FIG. 6 is a fragmentary side view of a portion of still another windshield washing system.

In still another alternative arrangement, the pump unit may not necessarily be integrally formed into a single housing to be positioned directly on top of the jug, but rather as a number of discrete components as shown in FIG. 6. For example, the electric pump may be conveniently mounted directly to a structure in the storage area of the vehicle as shown at 102 by way of mounting flanges 104 and threaded fasteners 106, and if desired in close proximity to the jug holder. An intake hose 107 joins the pumps intake opening with a nozzle assembly including the collar member and the nozzle.

The jug holder may also be configured to hold two or more bottles. For example, the pump 100 supplying fluids to the front windshield may be coupled to a first jug 110 while a pump 112 supplying fluids to the rear windshield may be coupled to the a second jug 114, in which case two separate level indication means as above described may be appropriate.

Figure 7:
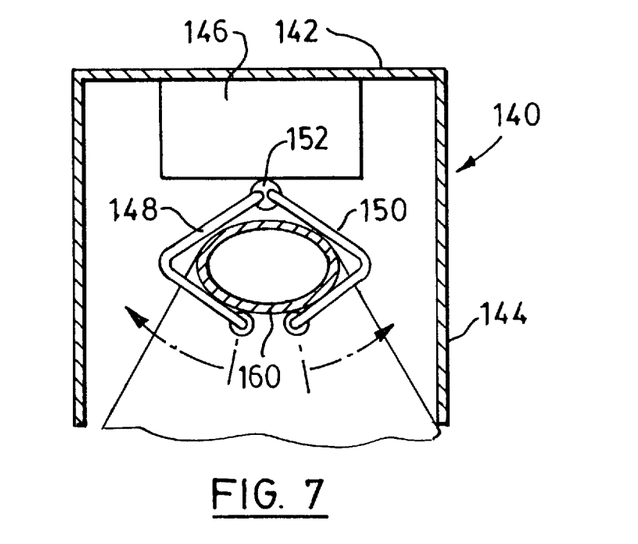
FIG. 7 is a fragmentary sectional view of a portion of still another windshield washing system taken in the context of line 4—4 of FIG. 3.
Figure 8:
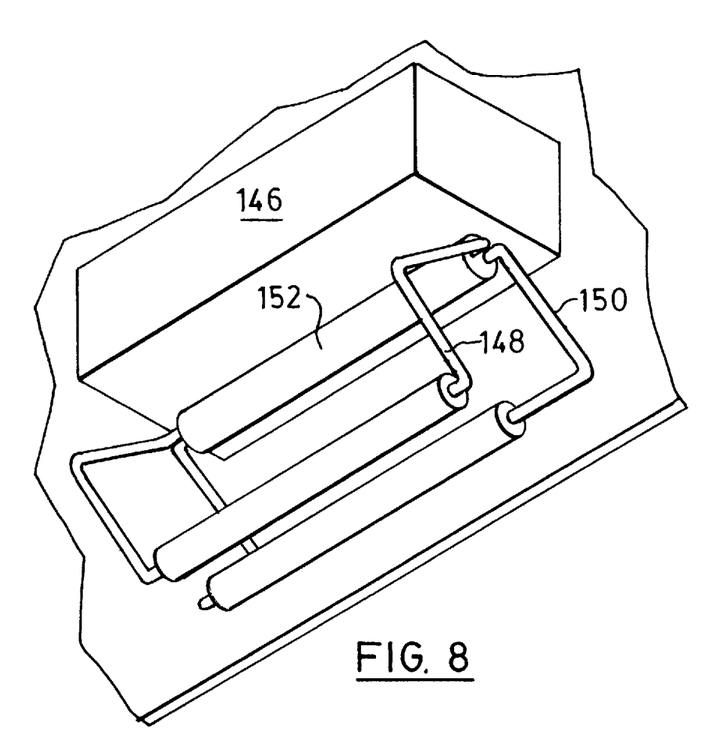
FIG. 8 is a fragmentary perspective view of the portion of the system illustrated in FIG. 7.

Referring to FIGS. 7 and 8, a portion of the housing of another windshield washing system is shown at 140 having top and side walls 142, 144 respectively and a central block 146 extending downwardly from the top wall. Secured to the block are a pair of bracket members 148, 150 which are inwardly biased by way of a spring arrangement contained with a central portion shown at 152. Each bracket has a wire form with a rubberized member and which is arranged to engage the hand grip formation 160 in the manner shown in FIG. 7.

While FIG. 2 above illustrates a register light 49 located in the vehicle in a location adjacent the driver of the vehicle, other forms of indicators are envisaged, such as the use of a buzzer either in the passenger compartment or somewhere else on the vehicle though still audible to the vehicle operator. There may also be applications where the function of the jug holder as shown above is provided by a preformed cavity in an interior vehicle panel, one or more straps or braces, or some other arrangement to provide the jug with some stability during operation of the vehicle.

Figure 9:
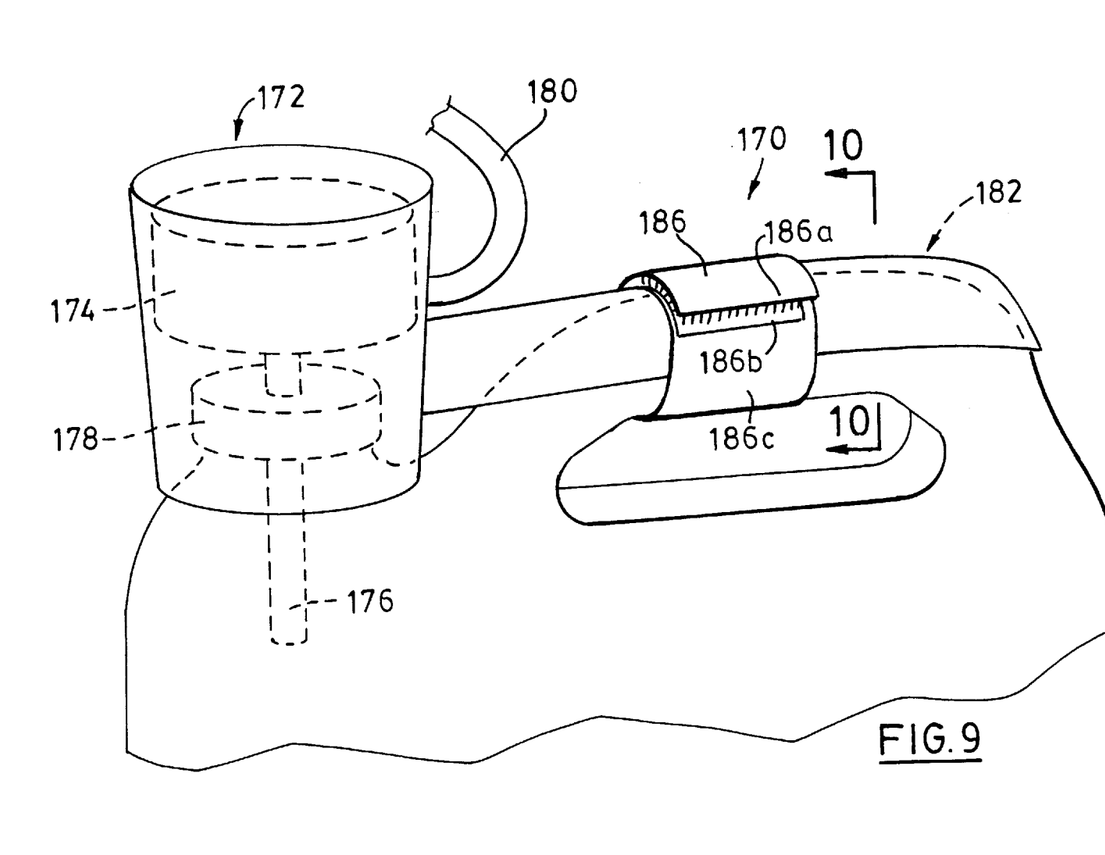
FIG. 9 is a fragmentary perspective view of a portion of still another windshield washing system.
Figure 10:
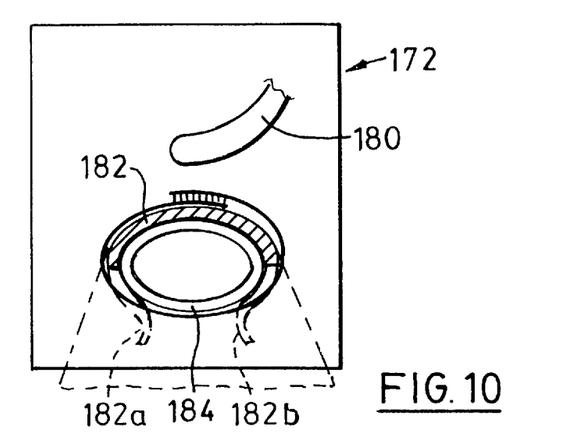
FIG. 10 is a sectional view taken on line 10—10 of FIG. 9.

Still another alternative arrangement is shown in FIGS. 9 and 10. In this case, the pump unit 170 has a pump housing 172 which contains an electric pump shown in phantom at 174 with an inlet connected to an inlet channel 176 extending through a cover 178. The pump has an outlet connected to an outlet channel 180 extending through the pump housing. Fixed to a rear end of the pump housing is an engaging formation in the form of a handle portion 182 with an inverted U-shaped cross section and which is dimensioned to engage the upper outer surface of a hand grip formation shown at 184 on a jug as shown in FIG. 10. The handle portion 184 is secured to the hand grip formation by a removable attachment means in the form of a tape fastener 186 which is wrapped around the handle portion together with the hand grip formation with provision on its remote end shown at 186a to attach to a complementary tape fastener pad 186b mounted on its back surface 186c. Alternatively, the handle portion 182 may include a pair of resilient engaging flanges as shown at 182a, 182b which may serve as a removable attachment means, in this case by being urged outwardly when the handle portion is pressed downwardly against the hand grip formation during installation.

Figure 11:
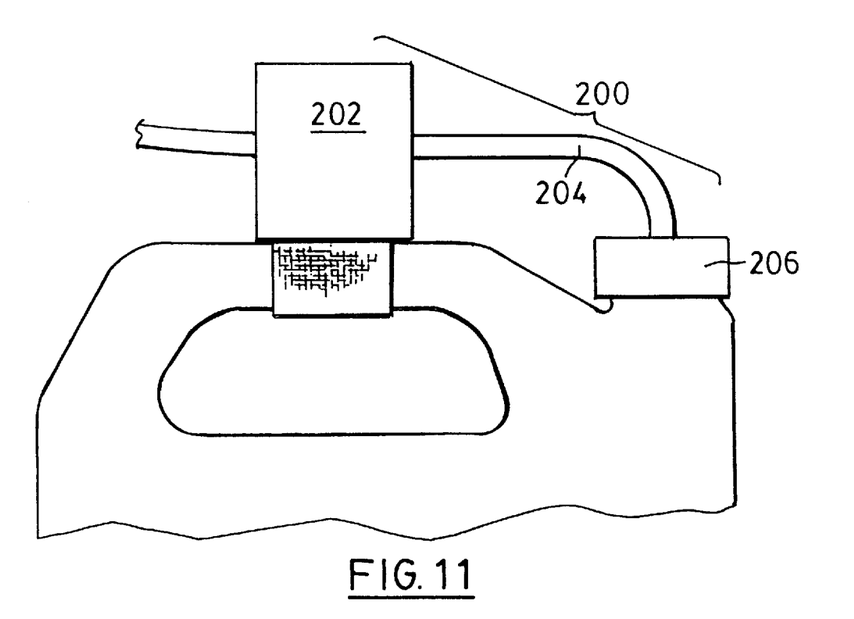
FIG. 11 is a fragmentary side view of a portion of yet another windshield washing system.

Referring to FIG. 11, yet another arrangement is shown, with the pump unit 200 including an electric pump 202 which is attached to the hand grip formation by way of a tape fastener as discussed above with reference to FIGS. 9 and 10. In this case, the pump 202 has an inlet which is connected to the inlet channel 204, itself extending through a cover 206. Of course, the pump 202 may be attached to a number of locations on the vehicle by the use of removable fasteners such as tape fasteners, threaded fasteners and the like. In addition, the inlet and outlet channels, depending on the lengths of each used, may also be strapped to the vehicle to by the use of tape and strap fasteners and the like to minimize damage thereto during installation and normal use.

The devices shown above may be installed as original equipment at the time of manufacture of the vehicle or may be retrofitted to the vehicle. In the latter case, each device may if desired be sold in the form of a kit with components as discussed above as well as couplings and fasteners and a set of instructions to install the kit. The kit may also include basic schematic sketches of existing on-board windshield washing systems to identify locations where power lines or switches can be bypassed so that the power and switching functions are directed to the new unit. The vehicle operator may install the kit in an appropriate storage area in the vehicle which may include the trunk as illustrated in the drawing, or in another storage area such as a front storage area adjacent the driver in a truck or bus. The electrical connections may then be made between the motor, the switch and the electrical system of the car in order that the pump can be operated. The vehicle operator may also in some instances want to install the system in the engine compartment.

Whether original equipment or as a retrofitted kit, the windshield washing system operates in the following manner. With the jug holder firmly in place, the vehicle operator installs a full jug of windshield washing fluid in the jug holder and then secures the jug in portion with the tape fasteners. The operator then removes the cap to expose the opening with the fluid contents therein. The housing is then oriented so that the nozzle assembly is inserted through the opening and into the fluid toward the bottom of the jug. The housing is pressed down so that the lateral flanges and vertical flange engaged the hand grip formation so as to removably secure the housing in its position on top of the jug.

In the case of the system shown at 140 in FIG. 7, pressing the housing down against the hand grip formation causes the bracket members to flex outwardly and thereafter encompass the hand grip formation.

As the full jug is installed into the jug holder, the level indication unit is immediately depressed indicating a full jug. The windshield washing system may then be used as required until such time as the level 'F' drops below the float (in the case of FIG. 5), below the short circuit unit as described above, or drops to a point at which the resultant weight of the jug no longer exceeds the force of the spring, causing the jug to be displaced upwardly and trigger the contact unit in turn to activate the 'empty' register light.

Thus, the windshield washing system as described above is intended to be easy to use, user friendly, particularly for handicapped and elderly drivers and those who may not be familiar with the complexities of car engines or mechanically inclined. The system should also be desirable to those in sanitary professions as the medical profession who want to minimize exposure to potentially harmful materials, as well as to other professionals who simply do not want to risk getting their hands and clothes soiled by having to lift the hood, hang over the motor and refill the conventional windshield fluid receptacle in the conventional manner. This should also reduce the number of incidences, for example, where the vehicle operator mistakenly fills the radiator overflow tank, while thinking it is the windshield washer receptacle.

The present system eliminates the need for installing a separate receptacle during vehicle manufacture, and is intended to universally fit all retail windshield washer jugs.

The same jug in which the windshield washing fluid is purchased may be easily adapted to be the receptacle during use, simply by placing the jug into the jug holder. The storage area may be selected which is relatively easy to access, such as the trunk of the car, without having to expose the vehicle operator to the potential dangers of an idling engine. In this case, the jug may be positioned in the jug holder and the cap removed with the pump unit then installed, all the while with the jug remaining in one place. Spillage may be essentially eliminated. The hood of the car need not be lifted and the operator may draw fluid from the same place where the fluid is stored. As a kit, the system may be retrofitted into existing windshield washing systems on current vehicles, simply by rerouting the fluid channels. Alternatively, the system may easily be added as original equipment to new vehicles.

The jug tends to hold more fluid than a conventional receptacle in a vehicle, which means that the windshield washing system employing the jug will have a larger quality of fluid meaning less frequent servicing.

I claim:

1. A vehicle windshield washing installation comprising:
   a vehicle having a storage location;
   a retail jug carrying windshield washing fluid positioned in said storage location; said jug having an upper region, an opening and a hand grip formation formed on said upper region;
   a pump unit for pumping said fluid from said jug; said pump unit including an inlet channel which is dimensioned to extend into said opening to be in fluid communication with said fluid, a cover removably attached to said opening and arranged to seal said opening with said inlet channel therein, said pump unit further including an outlet fluid channel for delivering said fluid to at least one predetermined location on said vehicle, wherein said pump unit includes a housing, said housing having engaging means for engaging with said hand grip formation, in order to removably secure said housing to said upper region.

2. An installation as defined in claim 1 wherein inlet channel extends through said cover, said cover being arranged to alternatively fit the opening on a number of said jugs.

3. An installation as defined in claim 2 further comprising a jug holder for engaging said jug in said storage location.

4. An installation as defined in claim 1 wherein said jug holder includes level indication means for indicating the level of fluids in said jug.

5. An installation as defined in claim 4 further comprising register means to receive a signal from said level indication means and operable to register when the level of said fluid drops below a predetermined level in said jug.

6. An installation as defined in claim 5 wherein said level indication means includes a spring biased plate member to engage said jug, and contact means operable between a contacted state and a uncontacted state to register when said plate member exceeds a predetermined height.

7. An installation as defined in claim 4 wherein said level indication means is located adjacent said inlet channel.

8. An installation as defined in claim 1 further comprising a first retail jug carrying windshield washing fluid and a first pump unit for pumping fluid therefrom, a second retail jug carrying windshield washing fluid and a second pump unit for pumping fluid therefrom, said first and second pump units being arranged to deliver said fluid to first and second predetermined locations on said vehicle.

9. An installation as defined in claim 1 wherein said engaging means includes a tape fastener to wrap around said housing and said hand grip formation.

10. An installation as defined in claim 1 wherein said engaging means includes an engaging portion extending outwardly from said housing.

11. An installation as defined in claim 10 wherein said hand grip formation has a generally circular cross section, said engaging portion having an inner surface which is complementary with said hand grip formation.

12. An installation as defined in claim 11 wherein said engaging portion extends longitudinally along said hand grip formation.

13. An installation as defined in claim 12 wherein said engaging portion has a u-shaped cross section.

14. An installation as defined in claim 1 wherein said engaging means includes a pair of resilient engaging flanges which are arranged to engage said hand grip formation.

15. A method of dispensing windshield washing fluid in a vehicle, comprising the steps of;
   positioning a retail jug carrying windshield washing fluid positioned in a storage location in a vehicle; said jug having an upper region including an opening and a hand grip formation;

providing a pump unit for pumping said fluid from said jug; said pump unit including an inlet channel and an outlet channel;

extending said inlet channel into said opening to be in fluid communication with said fluid;

providing a cover for sealing said opening with said inlet channel therein, orienting said outlet fluid channel so that said fluid is delivered to at least one predetermined location on said vehicle, and removably securing said pump to said hand grip formation.

16. A method as defined in claim 12 further comprising the step of providing a jug holder for engaging said jug in said storage location.

17. A vehicle windshield washing kit, comprising:

a pump unit for pumping the fluid from a retail jug carrying windshield washing fluid to be positioned in a storage location of a vehicle; said pump unit including an inlet channel which is dimensioned to extend into an opening in said jug so as to be in fluid communication with said fluid, a cover for removable attachment to said opening to seal said opening with said inlet channel therein, said pump unit further including an outlet fluid channel for delivering said fluid to at least one predetermined location on the vehicle, wherein said pump unit includes a housing, said housing having engaging means for engaging said hand grip formation, in order to removably secure said housing to said jug; and a sheet of instructions to install the kit into said vehicle.

18. A kit as defined in claim 17 wherein said cover is arranged to alternatively fit the opening on a number of said jugs.

19. A kit as defined in claim 18 further comprising a jug holder for engaging said jug in said storage location.

20. A kit as defined in claim 19 wherein said jug holder includes level indication means for indicating the level of fluid in said jug, and register means to receive a signal from said level indication means and operable to register when the level of said fluid drops below a predetermined level in said jug.

21. A kit as defined in claim 20 wherein said level indication means includes a spring biased plate member to engage said jug, and contact means operable between a contacted state and a uncontacted state to register when said plate member exceeds a predetermined height.

* * * * *